March 18, 1930. H. R. LOOSLEY 1,750,675

BEVERAGE DISPENSING AND COOLING BOX

Filed Oct. 11, 1928  2 Sheets-Sheet 1

Inventor:
Henry R. Loosley
By Edward E. Longan
atty.

March 18, 1930.  H. R. LOOSLEY  1,750,675
BEVERAGE DISPENSING AND COOLING BOX
Filed Oct. 11, 1928   2 Sheets-Sheet 2

Inventor.
Henry R. Loosley.
By Edward E. Longan
atty.

Patented Mar. 18, 1930

1,750,675

UNITED STATES PATENT OFFICE

HENRY R. LOOSLEY, OF EAST ST. LOUIS, ILLINOIS

BEVERAGE DISPENSING AND COOLING BOX

Application filed October 11, 1928. Serial No. 311,740.

This invention relates to beverage dispensing and cooling boxes and has for its primary object the purpose of providing improved means for simultaneously elevating the bottle holding tray and the lid of the box for providing easy access to the tray.

A further object of the invention is in providing the lid for the cooling box on top thereof so that when the lid is automatically opened during the elevating of the bottle holding tray, the dispenser can see at a glance by looking downward, the kind of beverage which is desired.

Another object of the invention is in providing the top of the cooling box of hinged sections and in which only one of the sections is elevated to an open position simultaneously with the lifting of the bottle tray, and in which all of the top sections can be manually folded to open positions so as to provide wide open access to the box for cleansing purposes.

A still further object of the invention is in disposing the ice compartment rearwardly of the box and the bottle tray forwardly of the ice compartment so that the bottle tray will be adjacent the dispensing front of the box.

Other and further objects will appear in the specification and be specifically pointed out in the appended claims, reference being had in the accompanying drawings, exemplifying the invention, and in which:—

Figure 1:
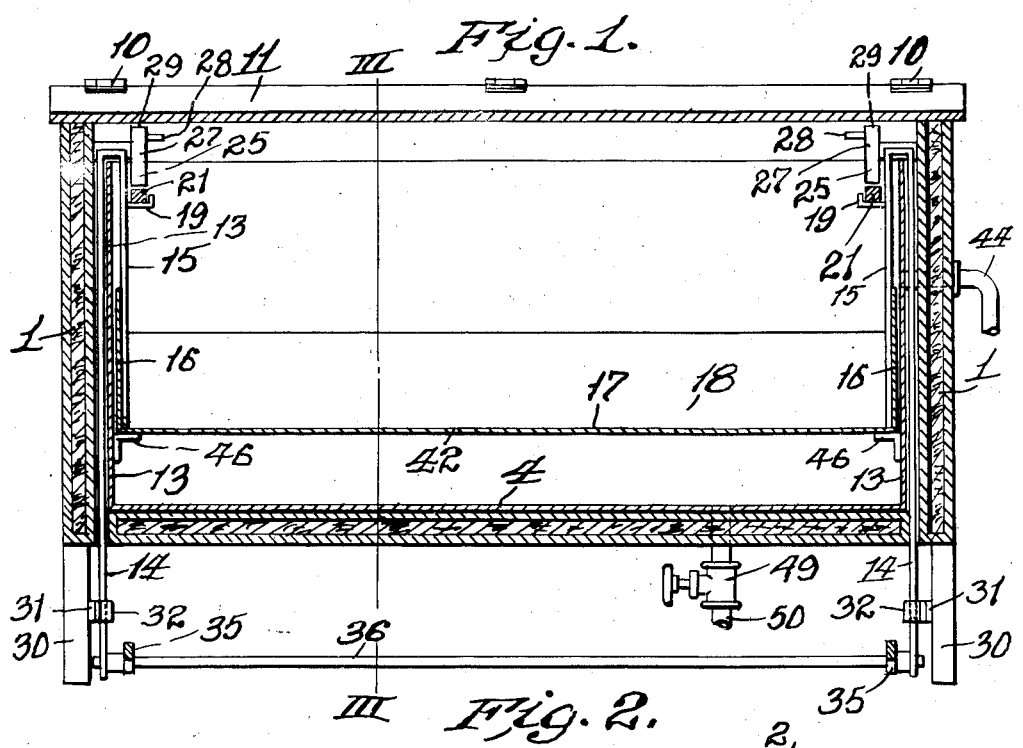
Figure 1 is a longitudinal vertical section taken approximately on the line I—I of Fig. 3 through this improved bottle dispensing and cooling box.
Figure 2:
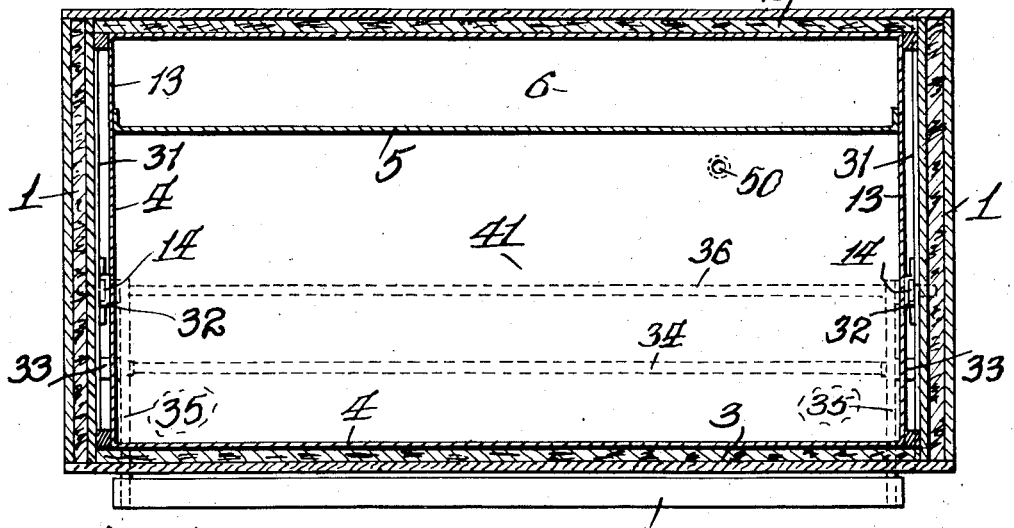
Figure 2 is a horizontal section taken approximately on the line II—II of Fig. 3.
Figure 5:
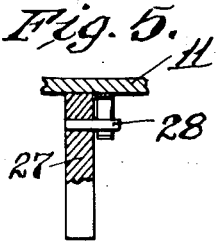
Figure 5 is an enlarged fragmentary vertical section taken approximately on the line V—V of Fig. 3.
Figure 6:
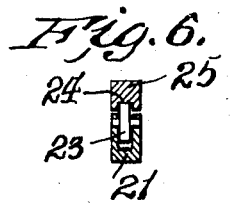
Figure 6 is an enlarged fragmentary vertical section taken approximately on the line VI—VI of Fig. 3.

Referring by numerals to the accompanying drawings this improved box is provided with insulated end walls 1 and rear and front walls 2 and 3 and disposed within said walls is a metallic cooling tank 4 which is open at its upper end and disposed in said tank a distance away from the rear wall 2 is a vertically disposed longitudinally extending partition 5, the space provided between the partition and rear wall 2 forming an ice chamber 6.

The top wall of the box comprises a rear panel 7 and hinged thereto by the hinges 8 is a rearwardly swingable section 9 and secured to the forward edge or end of the section 9 by hinges 10 is a downwardly inclined lid or section 11 adapted to have its front end 12 abut and rest on top of the front wall 3 of the box. The section 9 and the lid 11 are disposed lengthwise of the box and extend the length thereof.

The end walls 13 of the tank 4 are each spaced inwardly a distance from respective end walls 1 of the box and extending upwardly in each of the spacings thus provided is a flat bar 14, each of said bars at its upper end being bent over a top of a respective end wall 13 of the tank 4 and is depended downwardly into the tank as designated at 15, each depending end 15 being secured to a respective end wall 16 of a bottle holding tray 17. The tray 17 is provided with a plurality of longitudinally extending sections 18 for supporting bottles of beverage or cooling drinks in upright positions.

Secured to the depending portion 15 of each bar 18 is an outwardly and upwardly bent lip 19 and engaged within each lip is the extending end 20 of a lifting lever 21, each of said levers being pivoted at 22 to a respective tank end wall 13. The extending end 20 of each lever 21 is provided with a roller 23, each roller being engaged in an undercut groove 24 of a respective lifting lever 25, each of said levers 25 being pivoted at 26 to a respective wall 1 of the box and the opposite end of each of said levers is provided with an upturned end 27 and each having a horizontally projecting pin 28. The upturned end 27 of each lever 24 is rounded as designated at 29, said upturned ends being disposed so as to underengage the lid 11.

The box is provided with a pair of legs 30 at each end, and secured to each pair of legs is a transversely disposed strap 31 each having a vertically disposed guiding cleat or bracket 32, each of said straps 31 being provided with a depending portion 33. The depending portions 33 of straps 31 are in opposing alinement as well as are the brackets 32, each of said brackets being for the reception of the lower end of a respective flat bar 14, and supported in the depending portions 33 is a horizontal shaft 34 and rigidly secured to said shaft adjacent each end is a lever 35, the inner end of each lever being mounted on a horizontal rod 36 whereas the outward end of each lever is secured by a horizontally disposed foot portion 37. Each extending end of the rod 36 is engaged in a respective bifurcated end 38 of a bar 14. The shafts 34 and 36, the levers 35 and the foot portion 37 comprise a treadle for cooperation with the vertically extending flat bars 14.

Figure 4:
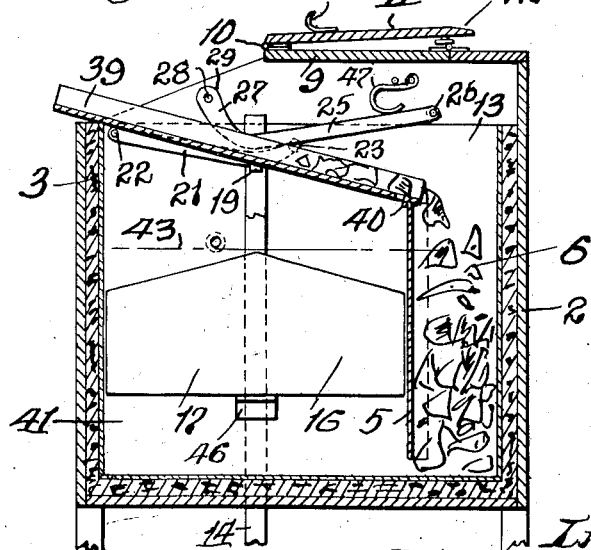
Figure 4 is a sectional view similar to Fig. 3 showing the application of a loading chute used for transferring chopped ice to the ice compartment rearwardly of the box.

To place this improved cooling box in condition for operation, broken ice of a size for entry into the ice chamber 6 is loaded in the chamber. This ice loading is carried on by placing a chute 39 in resting position on the upper end of the top wall 3 of the box and the partition 5 in which a lip 40 which is struck out from the bottom of the chute is engaged in holding position against the upper edge of the partition 5. This will place the chute 39 in an inclined position so that the chopped ice when mounted on the chute 39 can be carried over the cooling tank 4 from the dispensing front of the box. In the ice loading the lid 11 is swung rearwardly upon the section 9 as shown in Fig. 4, said figure also illustrating the ice loading operation.

After the ice chamber has been loaded the water from the melting ice will entrain beneath the partition 5 and arise during melting in the tank beneath the bottle holding tray 17 in the cooling compartment 41 and as the tray 17 is loaded with bottles in upright positions, the cold water will arise through the perforated bottom 42 of the tray. Obviously for efficient cooling, it is required that the ice chamber 6 be kept approximately filled with ice so that a water line as designated at 43 in Figs. 3 and 4 will be maintained so as to totally submerge the bottles in the tray, and for maintaining this water line an overflow 44 is provided.

Figure 3:
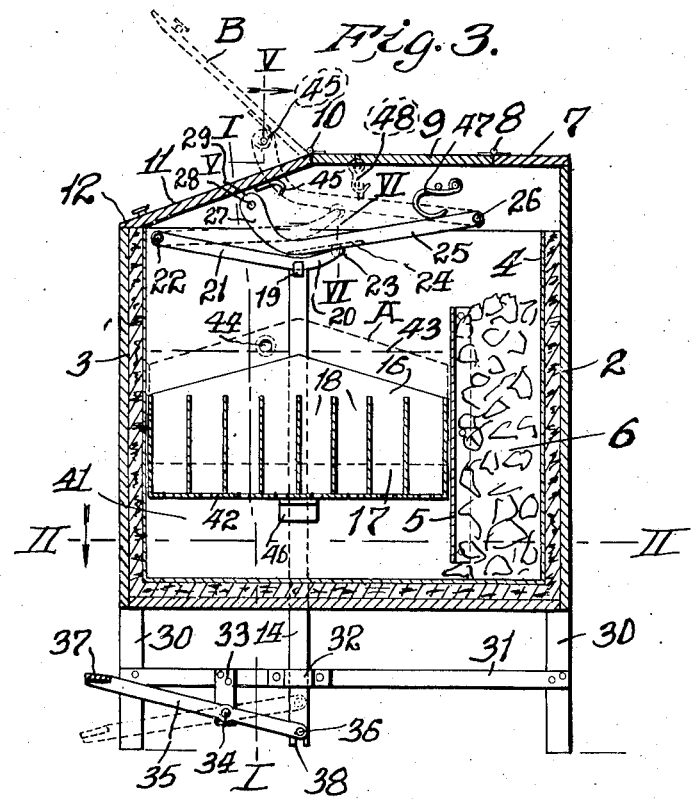
Figure 3 is a transverse vertical section taken approximately on the line III—III of Fig. 1.

When the dispenser is called upon to serve the bottled beverage from the tray, the foot pressure is brought to bear on the foot portion 37 of the treadle and the shaft 36 will be forced upwardly thereby simultaneously lifting both of the bars 14 and inasmuch as the tray 17 is secured to the depending ends 15 of said bars, the tray will be elevated to the approximate position shown in dotted lines at A in Fig. 3. Simultaneous with the upward lifting of the bars 14, the lips 19 carried by the depending portions 15 of said bars 14 will elevate the extending ends of respective levers 21 and the roller 23 of each lever will travel inwardly in respective grooves 24 of the levers 25 and in which the upturned ends 27 of respective levers 25 will be moved upwardly and the rounded end 29 of each lever 25 will be caused to underengage the lid 11 and elevate said lid to the open position shown at B in dotted lines in Fig. 3. Further rearward movement of the lid 11 is prevented by the pin 28 of each lever 25 engaging a respective hook 45, a pair of which are borne by the underside of the lid 11.

The lid 11 is held in the elevated position by keeping the treadle depressed and the dispenser can see at a glance from an inspection of the crowns of the bottles, the kind of beverage or drink desired as the bottle tops will be then above the water level in the cooling compartment 41. Upon release of the treadle the tray 17 will be lowered by gravity into the cooling compartment 41 in resting position upon the brackets 46 and simultaneous therewith the levers 21 and 25 will be lowered by reason of their weight and for assisting the lowering of the upper disposed levers 25, leaf springs 47 are provided. Obviously the lid 11 will be permitted to be lowered following the lowering of the levers 25.

For holding the hinged section 9 in closed position during the opening of the lid 11, fastening means such as the hooks 48 are provided. When it is desired to provide access to the box for cleaning purposes, the lid 11 is manually swung rearwardly upon the section 9 and the hooks 48 are released from securing position and the section 9 is swung rearwardly on the hinges 8, the lid 11 being carried therewith. When it is desired to drain the box during cleaning, the globe valve 49 in the drain pipe 50 is opened.

What I claim is:—

1. In a beverage dispensing and cooling box the combination with a cooling compartment in the box, of a tray adapted to be raised and lowered therein, foot-operated means located below the box and entering therein for raising and lowering said tray, a plurality of hinged sections forming a top for the box, a lever mechanism carried by said tray operating mechanism and by the box for engaging with one section of said lid for raising the same when said tray is elevated, and means engaging with said last mentioned lever mechanism for limiting the opening of said lid section.

2. In a beverage dispensing and cooling box the combination with a box having a cooling compartment and a holding tray, of means extending into said box and terminating below the box for raising and lowering said tray, a lid composed of hinged sections carried by said box for closing the same, a compound lever mechanism carried by said box and adapted to contact with one of said hinged sections for raising the same, means carried by said tray raising mechanism for operating said compound lever mechanism, and means carried by said lid section and engaging with said compound lever mechanism for limiting the amount of opening of said lid section.

3. A beverage dispensing and cooling box comprising a box having a lid, a cooling compartment in the box, a tray in said compartment, a pair of bars extending upwardly into the box each having its upper end bended downwardly and secured to said tray, a lever mechanism cooperable with said bar adapted to raise said bars and elevate said tray, and lifting means cooperable with said bars and said lid for opening said lid when the tray is elevated.

4. A beverage dispensing and cooling box comprising a box having a lid, a cooling compartment in the box, a tray in said compartment, a pair of bars extending upwardly into the box each having its upper end bended downwardly and secured to said tray, a lever mechanism cooperable with said bar adapted to raise said bars and elevate said tray, and a pair of co-acting levers co-operable with each bar and said lid for opening said lid when the tray is elevated.

5. The beverage dispensing and cooling box of claim 3 in which means is provided whereby said lids can be opened without elevating said tray.

In testimony whereof I have affixed my signature.

HENRY R. LOOSLEY.